United States Patent

Bauer

[11] Patent Number: 6,148,151
[45] Date of Patent: Nov. 14, 2000

[54] CONTROL SYSTEM FOR AN OBJECTIVE OF A CAMERA

[76] Inventor: Fritz Bauer, Pummergasse 20, 3002 Purkersdorf, Austria

[21] Appl. No.: 09/206,483

[22] Filed: Dec. 7, 1998

[30] Foreign Application Priority Data

Mar. 9, 1998 [AT] Austria ........................................ 407/98

[51] Int. Cl.[7] .............................. G03B 3/12; G03B 7/00; G03B 13/30; G03B 17/00
[52] U.S. Cl. ............................... 396/56; 396/87; 396/88; 396/131; 396/147; 396/259; 396/508
[58] Field of Search ................................... 396/85, 86, 87, 396/88, 131, 133, 56, 57, 259, 508, 505, 147; 348/211–214

[56] References Cited

U.S. PATENT DOCUMENTS

| | | | |
|---|---|---|---|
| 5,073,790 | 12/1991 | Ogawa | 396/87 |
| 5,146,071 | 9/1992 | Ookubo et al. | 396/87 X |
| 5,371,633 | 12/1994 | Kawamura et al. | 396/505 X |
| 5,570,177 | 10/1996 | Parker et al. | 348/213 X |

*Primary Examiner*—W. B. Perkey
*Attorney, Agent, or Firm*—Henry M. Feiereisen

[57] ABSTRACT

A control system for an objective of the camera, in particular a film camera, includes one or several drive units for automatically positioning at least one lens ring, e.g., for adjusting the focus position, the opening of the iris diaphragm and/or the focal length. The drive units can be used to adjust the lens ring(s) to a predefined set position. A device coupled to each of the lens rings determines the actual position of the lens rings relative to the objective and converts this position into a measuring output signal.

32 Claims, 2 Drawing Sheets

CONTROL SYSTEM FOR AN OBJECTIVE OF A CAMERA

CROSS-REFERENCES TO RELATED APPLICATIONS

This application claims the priority of Austrian Patent Application, Serial No. A 407/98, filed Mar. 9, 1998, the subject matter of which is incorporated herein by reference.

BACKGROUND OF THE INVENTION

The present invention relates in general to a control system for an objective of a camera, in particular a film camera, and in particular to a control system of a type including one or several drive units for automatically adjusting the positions of at least one lens ring, e.g., for focus position, iris diaphragm and focal length. The drive units can adjust the lens rings or rings to a predetermined set position.

Conventional control systems of this type allow remote adjustment of various lens rings of a camera objective. The angular position of the respective lens ring which is preset in an adjusting device, is adjusted by a motor drive that always moves the lens ring from a current position to the next desired position in incremental steps. With this method, however, after several adjustment steps a cumulative error is introduced which can cause a noticeable misalignment. This misalignment interferes with the camera operation and may require a manual fine adjustment in regular intervals.

A larger number of tiltable film cameras that operate completely automatically and are able to attain specific camera positions, are already in use. These cameras are frequently located in areas that cannot be reached by a camera assistant. Movie scenes must then frequently be re-taken because the automatic adjustment of the lens rings is not accurate enough. The film takes then become unusable because the exposure is wrong or the scenes are not in focus.

SUMMARY OF THE INVENTION

It is thus an object of the present invention to provide an improved control system for an objective of a camera, obviating the afore-stated drawbacks.

In particular, it is an object of the present invention to provide an improved control system of the aforedescribed type with allows a precise angular positioning of the lens ring or rings on the camera objective.

These objects, and others which will become apparent hereinafter, are attained in accordance with the present invention by providing a device which is coupled to the lens ring(s) and determines the actual position of the lens ring(s), with the device determining the actual position of the lens ring(s) relative to the camera objective and converts the actual position into a measuring output signal.

By determining the actual position, the deviation from the set position of the respective lens ring can be exactly determined and subsequently corrected. Consequently, the actual values of the lens ring positions are always available, so that an assistant or the cameraman may not have to read the lens ring positions manually which may be difficult. If the camera is located at a remote location, the actual lens ring position may be read remotely and the lens ring position may be corrected by remote control.

According to another feature of the present invention, the device for determining the actual position of the lens ring(s) may include an optical angular encoder in the form of an encoding element that is non-rotatably connected to the lens ring. The encoding element may include encoding tracks that can be read optically through reflection or transmission of light. The encoding element may also include a light transmitter and receiver system, wherein the light receiver produces the measuring output signal.

By applying appropriate encoding methods, the position of the lens ring(s) can be determined with great precision and high-resolution since mechanical friction forces do not interfere with the adjustment of the lens ring(s).

According to still another feature of the present invention, the device for determining the actual position of the lens ring(s) may include a magnetic distance sensor in the form of a tape that is preferably placed on the lens ring and filled with magnetic particles. The tape may be polarized periodically along several parallel tracks. The device may also include a magnetic sensor for sensing the tape without making physical contact with the tape, and for producing the measuring output signal.

This makes it possible to determine the position of the respective lens ring with great precision, without requiring a direct mechanical connection with the lens ring.

Advantageously, the magnetic sensor may be a magneto-resistive magnetic sensor.

According to still another feature of the present invention, the device for determining the actual position of the lens ring(s) may include a waveguide extending around the circumference of the objective in the region of the lens ring and a magnet that is connected to the lens ring at a predetermined location. The magnet may be at least partially movable inside the waveguide. An electromagnetic transmitter element and an acoustic receiver element may be arranged in the waveguide. The measured time difference between the signal transmitted by the transmitter element and the signal received by the receiver element represents the measuring output signal.

This feature also allows a precise and unambiguous measurement of the position of the lens ring.

According to yet another feature of the invention, the device for determining the actual position of the lens ring(s) may include an electrode located on the lens ring. The electrode can be rotated about a two-piece electrode that is located on the objective and increases or decreases in size depending on the position of the lens ring(s), without making physical contact with the electrode. The measuring output signal is produced by the capacitance ratio measured between the two-piece regions of the electrode and the rotatable electrode.

The position can therefore be determined through a capacitance measurement without making physical contact.

According to still another feature of the invention, the two-piece electrode may be represented by a rectangle that is parted along a diagonal. If lens rings are designed to rotate by more than 180°, an electrode that follows the helical path of the rotation, may be placed on the objective.

According to another embodiment of the invention, the measured values of the actual position may be transmitted to a different location for evaluation. Each of the measuring outputs of the device for determining the actual positions may be connected to a respective input of a measuring signal transmitter unit, with the output of the measuring signal transmitter unit connected to a measuring signal receiver unit capable of displaying the actual state of the lens ring(s) via one or several displays arranged in the measuring signal receiver unit.

In order to be able to reliably transmit the measured actual position values even for extreme camera positions, the measuring signal transmitter unit may include a wireless transmitter section. The measuring signal receiver unit may include a corresponding wireless receiver section. Both sections are capable of exchanging the measuring signal data.

The measuring signal transmitter unit may be attached to the camera that is associated with the objective, Alternatively, the measuring signal transmitter unit may be incorporated in the camera and form a part of the camera. The measuring signal transmitter unit may also be placed at other locations.

According to still another feature of the present invention, the measuring signal transmitter unit may also include a control receiver unit that is electrically connected to the drive(s) for positioning the lens ring(s) and a control transmitter unit that is located in the measuring signal receiver unit and has control actuator elements capable of adjusting the set position of the lens ring(s).

In this way, the control devices and the units which indicate the actual positions, can be functionally combined into a single unit rather than forming separate units.

According to yet another feature of the invention, the measuring signal receiver unit may be connected to a device for determining and displaying the depth of field. With this device, the actual positions of the lens ring(s) can be measured to determine the depth of field that is actually usable with the objective. The actual depth of field range can then be determined for each actual setting of the objective. This may eliminate the need to re-shoot a movie scene because the actors or the backdrop were outside the focal range due to a camera movement. Since is the actual data relating to the position of the lens ring(s) are automatically available, the actual useful depth of field can be automatically determined without to tedium of inspecting tables.

BRIEF DESCRIPTION OF THE DRAWING

The above and other objects, features and advantages of the present invention will now be described in more detail with reference to the accompanying drawing, in which.

DETAILED DESCRIPTION OF PREFERRED EMBODIMENTS

Figure 1:
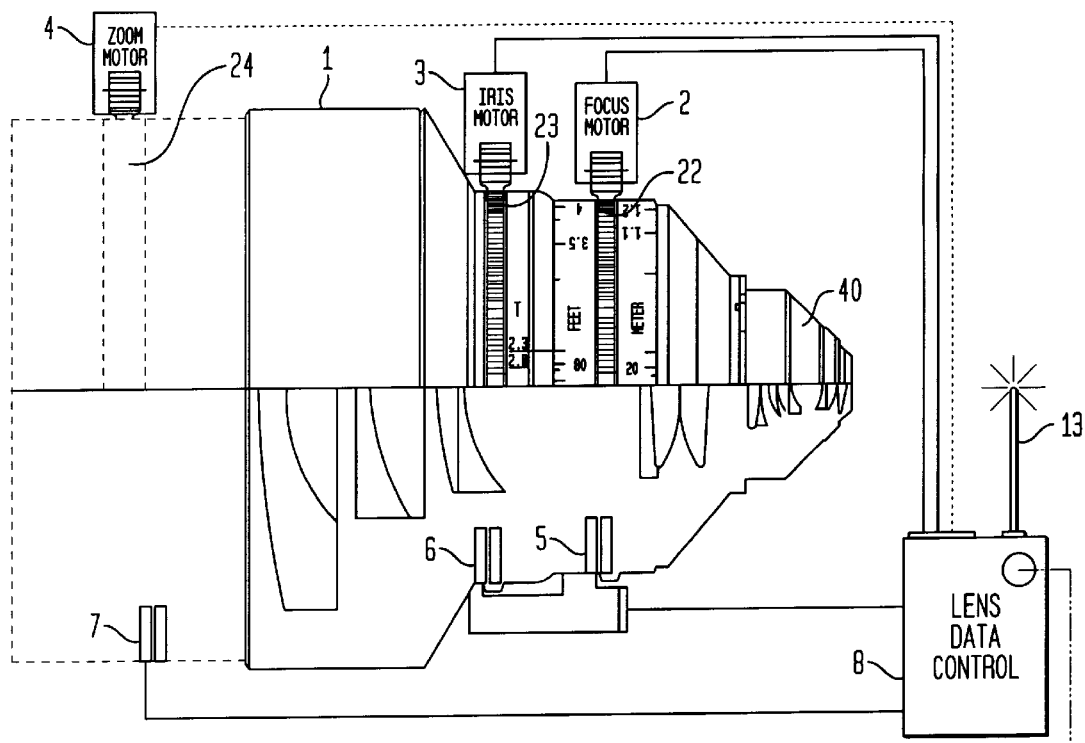
FIG. 1 is a schematic overall view of one embodiment of a control system according to the present invention for an objective of a camera.
Figure 1:
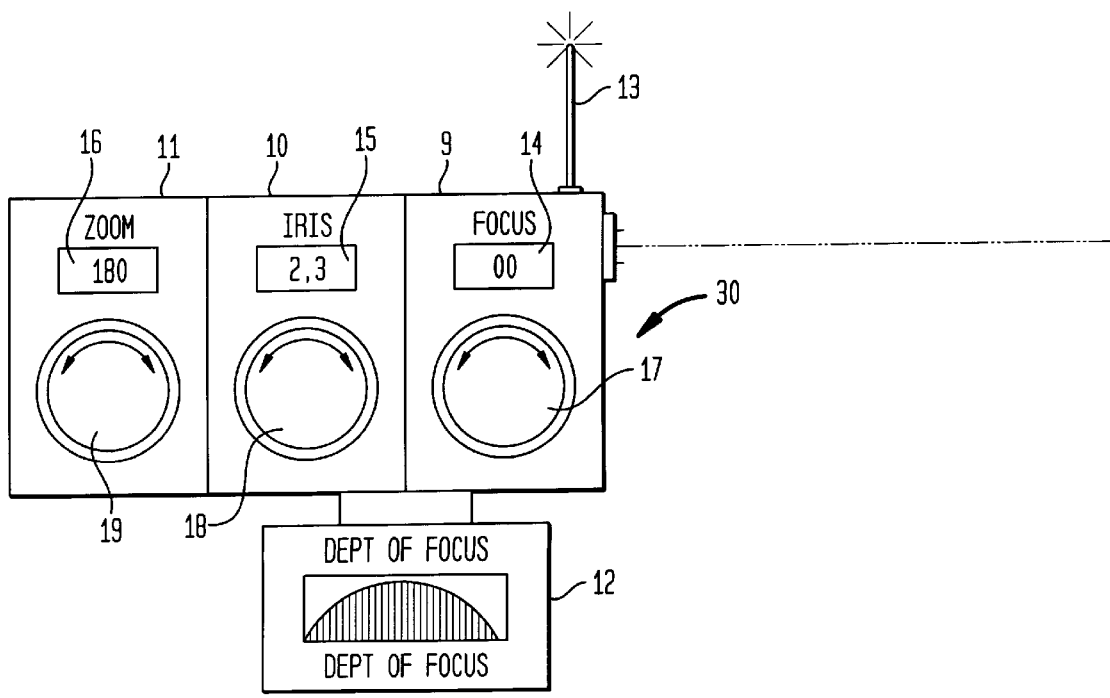

Throughout all the Figures, same or corresponding elements are generally indicated by same reference numerals.

Turning now to the drawing, and in particular to FIG. 1, there is shown a schematic overall view of one embodiment of a control system according to the present invention for an objective 1 of a film camera which includes three lens rings 22, 23, 24 for adjusting the focus position, the aperture of the iris diaphragm and the focal length of the objective. The objective 1 includes a system of optical lenses which are shown as a split elevation view of the objective. The objective is secured to the lens mount of the film camera through a bayonet mount. The system of the invention can also be used with other types of cameras and objectives.

The objective 1 includes several drive units 2, 3, 4 for automatically adjusting the position of the lens rings to predetermined set positions. When a control signal is sent to one of the drives, the drive initiates a rotation of the lens ring through a geared wheel that is driven by a motor, and stops the lens ring at the desired position. The rotation of the lens rings automatically causes a displacement of the optical lenses inside the objective 1 and/or an increase or decrease in the size of the iris diaphragm. The number and the functionality of the lens rings is in no way limited and can be varied in a number of different ways.

The lens ring can still be adjusted manually if a motor-controlled actuation is not desired.

It has been demonstrated in practice that an automatic adjustment of the lens rings, even if performed with great precision, is still inferior to a precise manual adjustment. The reason is that the drive units are not capable of providing the required precision along the entire circumference of the objective and during several adjustments.

In accordance with the invention, this situation can be corrected by providing a device that is coupled to each of the lens rings 22, 23, 24 for determining the actual positions 5, 6, 7 of the lens rings. The device determines the actual position of the lens rings 22, 23, 24 relative to the objective 1 and converts the position into a measuring output signal.

In this way, the adjustment movements that are actually performed by the drive units 2, 3, 4, can be controlled and, if necessary, corrected.

Various possible methods for coupling the lens rings with the devices that determine the actual positions 5, 6, 7, are described hereinafter with reference to several exemplified embodiments. In principle, these embodiments are independent of the specific device used to determine the positions.

Figure 2:
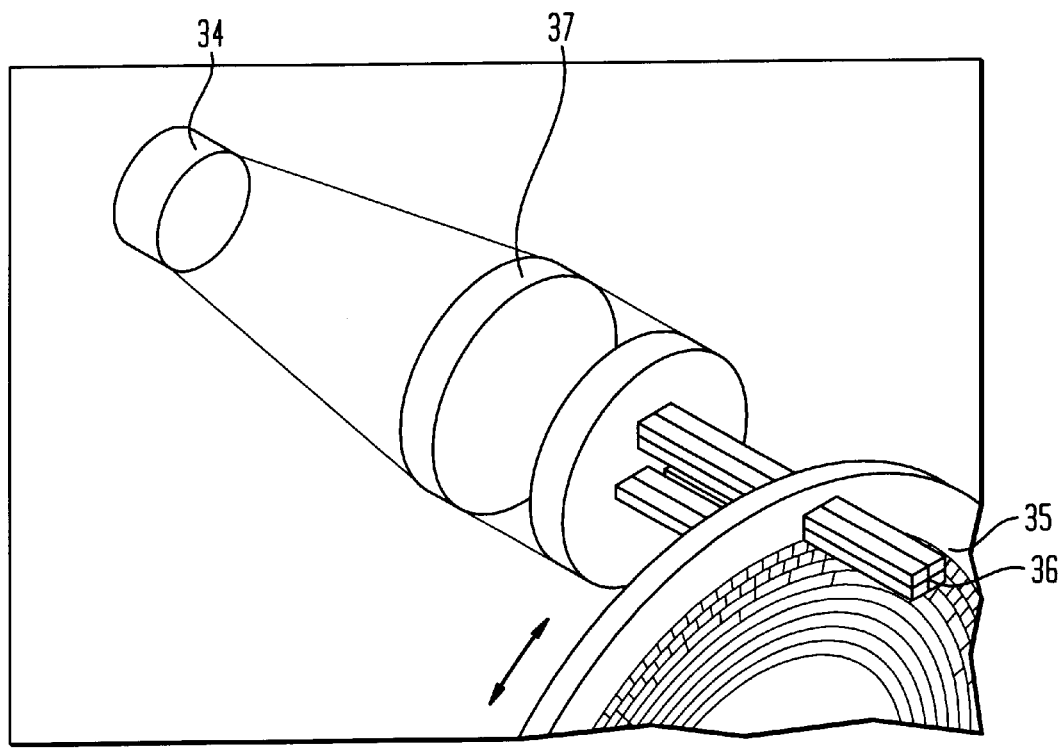
FIGS. 2 and 3 are schematic illustrations of a device for determining the actual position of the lens ring position.

In accordance with the nonlimiting example of FIG. 2, the device for determining the actual position includes an optical angular encoder with an encoder element 35 that is non-rotatably connected with the lens ring. The lens ring includes encoding tracks that can be read out optically using transmitted light. The device further includes a light transmitter and receiver system 34, 36. The measuring output signal is generated by the light receiver 36. A reflecting encoding disk can also be used, in which case the light receiver would be located on the same side as the light transmitter 34. To improve illumination of the tracks and to prevent crosstalk between the encoded tracks, a capacitor 37 is connected between the light transmitter 34 and the light receiver 36. To provide a sufficiently high resolution of the respective angular position, several encoded tracks are arranged on the encoding disk. Accordingly, the light receiver is subdivided into several active elements.

Although not shown in detail in the drawing, a device for determining the actual position of the lens ring may also include a magnetic distance sensor system. The magnetic distance sensor system is formed of a tape that is filled with magnetic particles and preferably attached to the lens ring. The tape is preferably periodically polarized along several parallel tracks. A magnetic sensor which scans the tape without making physical contact with the tape, produces the measuring output signal. The parallel tracks can be polarized periodically in a sinusoidal or rectangular pattern. The magnetic sensor which is preferably a magneto-resistive sensor, is guided across the tape in close proximity thereto according to the angular position of the lens ring and scans the magnetic signatures.

The resistance of the magneto-resistive sensor elements varies as a function of the magnetic fields strength so that under constant current conditions, the elements produce a voltage that is modulated according to the changing magnetic field of the tape. The sensor elements are manufactured using semiconductor technology and can therefore be miniaturized. The output signal of the magnetic sensor is processed by signal processing electronics capable of processing digital as well as analog signals, depending on the modulation type of the tape, to determine the position.

In order to provide higher resolution, phase-shifted magnetic tracks with a predetermined pattern are written on the tape. When this pattern is scanned, phase shifted signals are produced which are capable of resolving even those positions on the tape that are located between the magnetization periods. The measuring process operates incrementally and therefore requires that a reference signal be defined. An absolute position can be determined by scanning several parallel tracks.

It is also possible to provide the device for determining the actual position of the lens ring in the form of a waveguide that extends around the circumference of the objective in the region of the lens ring, and a magnet that is connected to the lens ring at a predetermined location.

The magnet is at least partially movable inside the waveguide. An electromagnetic transmitter element and an acoustic receiver element are arranged in the waveguide.

The transmitter element produces an electromagnetic pulse striking the permanent magnetic field of the magnet. The position of the magnet follows the position of the lens ring. This produces an angular momentum or a torsional pulse at the respective location of the waveguide. The latter pulse propagates with a constant sound velocity from the measuring location to the acoustic receiver element which converts the pulse into an electric pulse which is then sensed.

The measured time difference between the signal transmitted by the transmitter element and the signal received by the acoustic receiver element represents the measuring output signal. The measurement of the propagation time corresponds to a distance information between the magnet and the acoustic receiver element and subsequently has to be converted to corresponding angular data.

Figure 3:
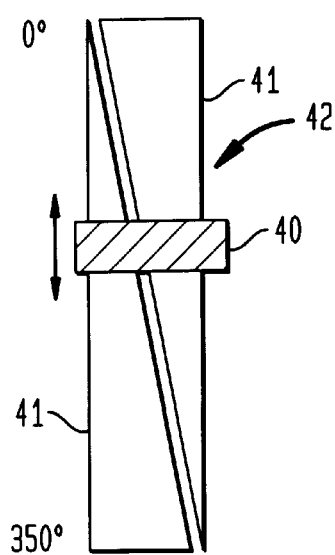

As shown in FIG. 3, the device for determining an actual position includes an electrode 40 which is attached to the lens ring 22, 23, 24. The electrode 40 can be pivoted across a split electrode 42 attached to the objective and increasing or decreasing in size depending on the position of the lens ring 22, 23, 24.

The measuring output signal is generated based on the capacitance ratio measured between the two-piece regions 41 of the electrode 42 and the rotatable electrode 40. The absolute position of the lens ring can be determined from the output signal.

According to the embodiment of FIG. 3, the split electrode 42, when in a flat state, represents a rectangle that is divided along a diagonal and composed of the rectangular triangles 41. However, the electrode 42 can also be selected to have another two-piece shape.

To attain a very high resolution, stray capacitances have to be eliminated by providing adequate shielding. In order to obtain the largest possible capacitance, an intermediate layer with a relatively high dielectric constant, e.g., a Teflon layer, on which the rotatable electrode 40 glides, is preferably placed between the rotatable electrode 40 and the two-piece electrode 42 in situations where these two electrode are separated by a small gap. If the two electrodes are be prevented from contacting each other at all, then the measured signal may have to be amplified.

As also seen in FIG. 1, each of the measuring outputs of the device for measuring the actual positions 5, 6, 7 is connected to a respective input of a measuring signal transmitter unit 8. This unit receives the measuring signals from the devices determining the actual positions 5, 6, 7 and transmits the signals to a measuring signal receiver unit 30 connected thereto.

This connection can be provided in different ways, e.g., via infrared, ultrasound, electrical wires and the like. Illustrated is a wireless connection exemplified by antennas 13. For this purpose, the measuring signal transmitter unit 8 includes a wireless transmitter section and the measuring signal receiver unit 30 includes a corresponding wireless receiver section which are adapted to transmit the measuring signal data. These data may have already been processed or can alternatively be processed after having been transmitted.

The measuring signal transmitter unit 8 can either be attached to the camera that is associated with the objective or can be a part of the camera. The transmitter unit 8 can also be carried by an assistant accompanying the camera man.

The wireless connection is advantageously implemented at camera locations that have automatic camera control and where the objective cannot be adjusted manually.

Several displays 14, 15, 16 capable of displaying the processed measuring signals indicating the actual position of the various lens rings 22, 23, 24 are arranged in the measuring signal receiver unit 30. In the example of FIG. 1, the focus setting is set to infinity, the iris diaphragm is set to the value 2.3 and the focal length to 180 mm. These values correspond to the values actually indicated on the objective which may be different from the set values inputted earlier.

As can be seen from FIG. 1, the measuring signal transmitter unit 8 also includes a control receiver unit that is electrically connected to the drives 2, 3, 4 for positioning the lens rings 22, 23, 24. The measuring signal receiver unit 30 also includes a control transmitter unit having control actuator elements 17, 18, 19. These control transmitter and receiver units can also be separate from the measuring signal units. In a simpler arrangement, the control units can be combined with the measuring signal units and can be used to adjust the desired state of the lens rings 22, 23, 24. The desired value of the lens ring positions can then be set via the control actuating elements 17, 18, 19 which are implemented as rotary control knobs. The desired value is transmitted as a control command via wireless transmission to the drive units 2, 3, 4 which drive the respective lens rings 22, 23, 24.

When the set value is changed from one position to the next, the displays 14, 15, 16 indicate the actual position of the lens rings 22, 23, 24. The position of the focusing rings 22, 23, 24 can be corrected with the control knobs 17, 18 or 19, which can be rotated until the desired values on the objective 1 are attained.

Since the actually set position values of the lens rings are accessible, the depth of field can also be precisely determined and displayed. In this way, the cameraman is always kept current of the limiting values for the depth of field of the exposed film. The use of tables can be eliminated by connecting the measuring signal receiver unit 30 to a device for determining and displaying the depth of field 12. The device can be used in conjunction with the actual position of the lens ring 22, 23, 24 to measure and display the useful depth of field that the objective 1 can provide. The depth of field range can then be readily viewed.

While the invention has been illustrated and described as embodied in a control system for an objective of a camera, it is not intended to be limited to the details shown since various modifications and structural changes may be made without departing in any way from the spirit of the present invention.

What is claimed as new and desired to be protected by Letters Patent is set forth in the appended claims:

1. A control system for an objective of a camera, comprising:

at least one lens ring disposed on the objective;

at least one drive unit or automatically adjusting a position of the lens ring to a predetermined desired state; and at least one position determining means coupled to the lens ring for determining an actual position of the lens ring relative to the objective, said position determining means converting the actual position into a measuring output signal, wherein the position determining means includes a waveguide extending about the circumference of the objective in the region of the lens ring, a magnet connected to the lens ring at a predetermined location and at least partially movable inside the waveguide, an electromagnetic transmitter element, and an acoustic receiver element arranged in the waveguide, wherein the electromagnetic transmitter element transmits a signal that is received by the acoustic receiver element and wherein a time difference measured between transmission of the signal by the electromagnetic transmitter element and reception of the signal by the acoustic receiver element represents the measuring output signal.

2. A control system for an objective of a camera, comprising:

at least one lens ring disposed on the objective; at least one drive unit for automatically adjusting a position of the lens ring to a predetermined desired state; and at least one position determining means coupled to the lens ring for determining an actual position of the lens ring relative to the objective, said position determining means converting the actual position into a measuring output signal, wherein the position determining means includes a first electrode located on the objective and comprised of two sections having areas that increase or decrease in size depending on the position of the lens ring, and a second electrode arranged on the lens ring and capable of rotating without physically contacting the first electrode, the first and second electrode forming a capacitor, wherein the measuring output signal is produced based on a capacitance ratio measured between the two sections of the first electrode and the second electrode.

3. The control system of claim 2 wherein the sections of the first electrode, when arrange on a plane, form a rectangle which is separated along a diagonal of the rectangle.

4. A control system for an objective of a camera, comprising:

at least one lens ring disposed on the objective;

at least one drive unit for automatically adjusting a position of the lens ring to a predetermined desired state;

at least one position determining means coupled to the lens ring for determining an actual position of the lens ring relative to the objective, said position determining means converting the actual position into a measuring output signal; and a measuring signal transmitter unit receiving as an input signal the measuring output signal of the position determining means and producing an output signal; a measuring signal receiver unit receiving the output signal from the measuring signal transmitter unit; and at least one display device arranged in the measuring signal receiver unit for displaying the actual position of the lens ring.

5. The control system of claim 4 wherein the position determining means is provided in the form of an optical angular encoder which includes an optical encoding element connected to the lens ring, an encoding tracks capable of at least one of reflecting or transmitting optical radiation, a light transmitter for generating the optical radiation, and a light receiver for generating the measuring output signal.

6. The control system of claim 4 wherein the position determining means is provided in the form of a magnetic distance sensor which includes a tape connected to the lens ring and periodically magnetically polarized along at least one track, and a magnetic sensor for sensing the tape without making physical contact with the tape and for generating the measuring output signal.

7. The control system of claim 6 wherein the magnetic sensor is a magneto-resistive magnetic sensor.

8. The control system of claim 4 wherein the measuring signal transmitter unit includes a wireless transmitter section, and the measuring signal receiver unit includes a wireless receiver section, said wireless transmitter section and said wireless receiver section being adapted to transmit the measuring signal data.

9. The control system of claim 4 wherein the measuring signal transmitter unit is attached to the camera.

10. The control system of claim 4 wherein the measuring signal transmitter unit forms a part of the camera.

11. The control system of claim 4 wherein the measuring signal transmitter unit further includes a control receiver unit which is electrically connected to the drive positioning the lens ring, said measuring signal receiver unit further including a control transmitter unit having control actuator elements capable of adjusting the set position of the lens ring.

12. The control system of claim 4 wherein the position of the lens ring defines a focus position of the objective.

13. The control system of claim 4 wherein the position of the lens ring defines a size of an iris diaphragm of the objective.

14. The control system of claim 4 wherein the position of the lens ring defines a focal length of the objective.

15. The control system of claim 6 wherein the tape is filled with magnetic particles.

16. The control system of claim 6 wherein the at least one track is a plurality of tracks that are parallel with respect to each other.

17. The control system of claim 5 wherein the optical encoding element is secured against rotation with respect to the lens ring.

18. A control system for an objective of a camera, comprising:

at least one lens ring disposed on the objective;

at least one drive unit for automatically adjusting a position of the lens ring to a predetermined desired state;

at least one position determining means coupled to the lens ring for determining actual position of the lens ring relative to the objective, said position determining means converting the actual position into a measuring output signal;

a measuring signal receiver unit responsive to the measuring output signal of the position determining means; and a means connected to the measuring signal receiver unit for determining and optically displaying the depth of field from the actual positions of the lens ring attainable with the objective.

19. A control system for an objective of a camera, comprising at least one drive unit for automatically adjusting a position of at least one lens ring to thereby impact at least one of a focus position, an iris diaphragm and a focal length, with the drive unit adjusting a predetermined desired state of the lens ring; and at least one device coupled to the lens ring for determining the actual position of the lens ring, wherein the device determines the actual position of the lens ring relative to the objective and converts the actual position into a measuring output signal, wherein the device for determining the actual position of the lens ring includes a waveguide extending around the circumference of the objective in the region of the lens ring and a magnet that is connected to the lens ring at a predetermined location, wherein the magnet is at least partially movable inside the waveguide, wherein an electromagnetic transmitter element and an acoustic receiver element are arranged in the waveguide and wherein the measured time difference between the signal transmitted by the transmitter element and the signal received by the receiver element represents the measuring output signal.

20. A control system for an objective of a camera, comprising at least one drive unit for automatically adjusting a position of at least one lens ring to thereby impact at least one of a focus position, an iris diaphragm and a focal length, with the drive unit adjusting a predetermined desired state of the lens ring; and at least one device coupled to the lens ring for determining the actual position of the lens ring, wherein the device determines the actual position of the lens ring relative to the objective and converts the actual position into a measuring output signal, wherein the device for determining the actual position of the lens ring includes an electrode located on the lens ring, wherein the electrode is rotatable, in a contact-free manner, about a split electrode which is located on the objective and increases or decreases in size depending on the position of the lens ring, wherein the measuring output signal is produced based on the capacitance ratio of the two-piece regions of the electrode with respect to the rotatable electrode.

21. The control system of claim 20 wherein the split electrode in a planar state is represented by a rectangle that is separated along a diagonal.

22. A control system for an objective of a camera, comprising at least one drive unit for automatically adjusting a position of at least one lens ring to thereby impact at least one of a focus position, an iris diaphragm and a focal length, with the drive unit adjusting a predetermined desired state of the lens ring; and at least one device coupled to the lens ring for determining the actual position of the lens ring, wherein the device determines the actual position of the lens ring relative to the objective and converts the actual position into a measuring output signal, wherein the measuring outputs of the device for determining the actual position is connected to a respective input of a measuring signal transmitter unit, and wherein the output of the measuring signal transmitter unit is connected to a measuring signal receiver unit capable of displaying the actual state of the lens ring via one or several displays arranged in the measuring signal receiver unit.

23. The control system of claim 22 wherein the device for determining the actual position of the lens ring includes an optical angular encoder which is formed from an encoding element that is non-rotatably connected to the lens ring and provided with encoding tracks that can be read optically through reflection or transmission of light and a light transmitter and receiver system, wherein the light receiver generates the measuring output signal.

24. The control system of claim 22 wherein the device for determining the actual position of the lens ring includes a magnetic distance sensor in the form of a tape that is preferably placed on the lens ring and filled with magnetic particles, wherein the tape is preferably periodically polarized along several parallel tracks, and a magnetic sensor for sensing the tape without making contact with the tape and generating the measuring output signal.

25. The control system of claim 24 wherein the magnetic sensor is a magneto-resistive magnetic sensor.

26. The control system of claim 22 wherein the measuring signal transmitter unit includes a wireless transmitter section and the measuring signal receiver unit includes a corresponding wireless receiver section which are adapted to transmit the measuring signal data.

27. The control system of claim 22 wherein the measuring signal transmitter unit is attachable to the camera that is associated with the objective, or forms part of the camera.

28. The control system of claim 27 wherein the measuring signal transmitter unit further includes a control receiver unit that is electrically connected with the drive for positioning the lens ring, and wherein the measuring signal receiver unit further includes a control transmitter unit having control actuator elements capable of adjusting the set position of the lens ring.

29. A control system for an objective of a camera, comprising at least one drive unit for automatically adjusting a position of at least one lens ring to thereby impact at least one of a focus position, an iris diaphragm and a focal length, with the drive unit adjusting a predetermined desired state of the lens ring; at least one device coupled to the lens ring for determining the actual position of the lens ring, wherein the device determines the actual position of the lens ring relative to the objective and converts the actual position into a measuring output signal, a measuring signal receiver unit capable of displaying the actual state of the lens ring via one or several displays arranged in the measuring signal receiver unit, wherein the measuring signal receiver unit is connected to a device for determining and optically displaying the depth of field, wherein the device is used to determine from the actual positions of the lens ring the depth of field that can actually be used with the objective.

30. The control system of claim 29 wherein the device for determining the actual position of the lens ring includes an optical angular encoder which is formed from an encoding element that is non-rotatably connected to the lens ring and provided with encoding tracks that can be read optically through reflection or transmission of light and a light transmitter and receiver system, wherein the light receiver generates the measuring output signal.

31. The control system of claim 29 wherein the device for determining the actual position of the lens ring includes a magnetic distance sensor in the form of a tape that is preferably placed on the lens ring and filled with magnetic particles, wherein the tape is preferably periodically polarized along several parallel tracks, and a magnetic sensor for sensing the tape without making contact with the tape and generating the measuring output signal.

32. The control system of claim 31 wherein the magnetic sensor is a magneto-resistive magnetic sensor.

* * * * *